US012643628B2

(12) United States Patent
Schumacher et al.

(10) Patent No.: US 12,643,628 B2
(45) Date of Patent: Jun. 2, 2026

(54) DRIVE SYSTEM

(71) Applicant: Robert Bosch GmbH, Stuttgart (DE)

(72) Inventors: Christoph Schumacher, Dusslingen (DE); Daniel Hettinger, Reutlingen-Bronnweiler (DE); Daniel Schwenk, Dornstetten (DE); Harald Hundt, Aichelberg (DE); Julian Binder, Wannweil (DE); Peter Kimmich, Steinenbronn (DE); Sigmund Braun, Kusterdingen (DE); Stefan Holst, Reutlingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 638 days.

(21) Appl. No.: 18/170,868

(22) Filed: Feb. 17, 2023

(65) Prior Publication Data

US 2023/0278662 A1     Sep. 7, 2023

(30) Foreign Application Priority Data

Mar. 1, 2022    (DE) ..................... 10 2022 202 104.5

(51) Int. Cl.
     B62M 6/55          (2010.01)
(52) U.S. Cl.
     CPC .................................... B62M 6/55 (2013.01)
(58) Field of Classification Search
     CPC . B62M 6/55; B62M 6/40; B62M 6/80; B62M 7/04; F03G 5/064
     See application file for complete search history.

(56) References Cited

U.S. PATENT DOCUMENTS

| | | | | |
|---|---|---|---|---|
| 10,300,985 B2 * | 5/2019 | Mano | .................... | F16B 5/0233 |
| 2017/0314593 A1 | 11/2017 | Mano | | |
| 2019/0039677 A1 * | 2/2019 | Noda | ........................ | B62M 6/90 |
| 2023/0322327 A1 * | 10/2023 | Greven | .................... | B62M 6/55 |
| | | | | 180/206.4 |
| 2023/0415849 A1 * | 12/2023 | Hemsing | ................ | B62K 19/34 |

FOREIGN PATENT DOCUMENTS

| | | | | | |
|---|---|---|---|---|---|
| CN | 116710353 A | * | 9/2023 | .............. | B62M 6/55 |
| DE | 102016112778 A1 | | 1/2017 | | |
| DE | 102017201617 A1 | * | 8/2018 | .............. | B62M 6/55 |
| DE | 102020200385 A1 | * | 7/2021 | .............. | B62M 6/55 |
| DE | 102021201023 A1 | * | 8/2022 | .......... | B60K 7/0007 |

(Continued)

*Primary Examiner* — Drew J Brown
(74) *Attorney, Agent, or Firm* — NORTON ROSE FULBRIGHT US LLP

(57)          ABSTRACT

A drive system of a vehicle which is operable using muscular energy and/or motor power. The drive system includes a drive unit and a frame interface, the drive unit being at least partially situated between a first wall and a second wall of the frame interface. The drive system further includes a holding device, which holds the drive unit on each of the two walls, the holding device being fixed in place on the second wall; and a tolerance compensation element. The first wall has a first wall opening. The tolerance compensation element is developed in the form of a sleeve and is situated inside the first wall opening. A part of the holding device is disposed inside the tolerance compensation element in an axially movable manner.

25 Claims, 14 Drawing Sheets

(56) References Cited

FOREIGN PATENT DOCUMENTS

| DE | 102021201404 A1 | * | 8/2022 | ............ F16B 5/0233 |
| DE | 102021202473 A1 | * | 9/2022 | ............. F16B 19/02 |
| EP | 3795462 A1 | | 3/2021 | |
| JP | 2023553030 A | * | 12/2023 | ........... B62K 25/286 |
| WO | WO-2022043182 A1 | * | 3/2022 | ............. B62K 19/30 |

* cited by examiner

DRIVE SYSTEM

CROSS REFERENCE

The present application claims the benefit under 35 U.S.C. 119 of German Patent Application No. DE 10 2022 202 104.5 filed on Mar. 1, 2022, which is expressly incorporated herein by reference in its entirety.

FIELD

The present invention relates to a drive system and to a vehicle which includes the drive system.

BACKGROUND INFORMATION

Drive systems equipped with drive units held between two walls of a frame interface are available in the related art. The drive unit is screwed together with the two opposite walls. As a rule, a gap must be bridged between the drive unit and one of the walls. To make this possible, a holding plate may be provided on the drive unit, which is elastically deformed to bridge the gap. However, this may have a disadvantageous effect on the mechanical loading and the tightness of the drive system.

SUMMARY

A drive system according to the present invention allows for an advantageous mounting of a drive unit inside a housing in terms of loading technology. In addition, an especially simple and cost-effective production and assembly of the drive unit is possible. This may be achieved by a drive system which includes a drive unit, and a frame interface. According to an example embodiment of the present invention, the drive unit is at least partially situated between a first wall and a second wall of the frame interface. The first wall and the second wall are preferably connected to each other by a connecting wall, in particular so that the first wall, the second wall and the connecting wall jointly form a single-piece U-shaped frame. In addition, the drive system includes a holding device, which holds the drive unit on each of the two walls. The holding device may particularly be provided as one or more fastening element(s), which mechanically retain(s) the drive unit on each of the two walls. The holding device is attached to the second wall, in particular fixed in place. In addition, the drive system has a tolerance-compensation element, which is developed in the form of a sleeve and situated inside a first wall opening of the first wall. A part of the holding device is situated inside the first wall opening with the aid of the tolerance compensation element in an axially movable manner.

In other words, the drive unit is fastened to the frame interface with the aid of the holding device in such a way that a fixation on the second wall is realized, and an axial movement on the first wall is possible. For instance, this fastening may also be considered a fixed bearing system on the second wall and a floating bearing on the first wall. This provides numerous advantages. Because of the axial movability on the first wall, a tolerance compensation between the frame interface with the two walls and the drive unit can be achieved in a particularly uncomplicated manner. For instance, this makes it possible to compensate for production-related tolerances and also for distensions and changes in length that arise when the drive system is in operation. By providing a tolerance compensation element as an additional component, the tolerance compensation can be carried out in a particularly simple manner and be precisely adapted to the individual tolerance situation. More specifically, the tolerance compensation element is provided to enable a play-free positioning between the holding device and first wall in a radial direction of the wall opening.

Preferred refinements and example embodiments of the present invention are disclosed herein.

According to an example embodiment of the present invention, the tolerance compensation element preferably has a plain bearing bush and a damping sleeve, the damping sleeve surrounding the plain bearing bush. For instance, the damping sleeve may completely surround the plain bearing bush in the circumferential direction. As a preferred alternative, the damping sleeve may preferably have one or more recesses. The plain bearing bush thus is preferably situated radially inside. This provides a low-friction sliding contact between the holding device and the tolerance compensation element, which makes it possible in a particularly reliable manner to avoid an unintentional axial tensioning between the holding device and the first wall. On the one hand, the damping sleeve may prevent or reduce a transmission of vibrations between the first wall and the holding device and, on the other hand, ensure a reliable fastening of the tolerance compensation element in the wall opening.

The plain bearing bush and the part of the holding device situated inside the tolerance compensation element are preferably designed in such a way that the part of the holding device disposed inside the tolerance compensation element widens the plain bearing bush in a radial direction in order to tension the tolerance compensation element with respect to the first wall, in particular in a fully mounted state. For instance, this may be achieved with the aid of a fit between the part of the holding device and the plain bearing bush. The plain bearing bush preferably has a cylindrical development at its inner circumference. As an alternative, the plain bearing bush may have a tapered development in the direction of the drive unit at its inner circumference, the part of the holding device having a larger diameter. This makes it possible for the tolerance compensation element to be pressed radially into the wall opening of the first wall by the holding device, so that a particularly reliable, firm mounting is achievable. In addition, a radial tolerance can be reduced to zero in this way.

The plain bearing bush preferably has a slotted development. The radial widening can then be induced in an especially simple and selective manner. Moreover, it is easier to press the tolerance compensation element into the wall opening.

The slot of the plain bearing bush is preferably positioned at an angle with respect to an axial direction of the plain bearing bush, especially when the slot is viewed from the radial direction. An optimal, uniform mechanical support around the entire circumference and across the entire axial length of the plain bearing bush is thereby able to be provided.

According to an example embodiment of the present invention, the part of the holding device situated inside the tolerance compensation element has a tapered development at least regionally in the direction of the second wall, preferably in the form of a lead-in chamfer. For instance, this part may be a bolt head or a screw head of a screw. A particularly uncomplicated mounting and a selective radial widening of the plain bearing bush are achievable in this way.

Especially preferably, according to an example embodiment of the present invention, the damping sleeve has at least one sealing lip at a radial outer side. The at least one sealing lip is preferably situated at an axial end of the damping sleeve. Preferably, one sealing lip in each case is situated at both axial ends. The at least one sealing lip is developed in such a way that a form-fit exists between the damping sleeve and the first wall when the tolerance compensation element is situated inside the first wall opening. In other words, the tolerance compensation element is able to be fastened to the first wall opening, e.g., clipped in, in a form-fitting manner with the aid of the sealing lip. This achieves a particularly simple and reliable support of the tolerance compensation element. In addition, an especially reliable sealing effect is provided at the first wall opening.

Especially preferably, according to an example embodiment of the present invention, the damping sleeve of the tolerance compensation element has at least one sealing lip on a radial inner side. At both axial ends of the damping sleeve, a radially inwardly projecting sealing lip is preferably provided. This may further improve a sealing effect on the first wall.

Especially preferably, according to an example embodiment of the present invention, the damping sleeve is developed in such a way that the holding device pushes the at least one sealing lip radially outward when the part of the holding device is situated inside the tolerance compensation element. At the radially inner side of the tolerance compensation element, a sealing lip preferably protrudes, which is pushed radially outward by the part of the holding device, to thereby also force the radially outer sealing lip in an outward direction. These two sealing lips are preferably positioned on the side of the tolerance compensation element facing the drive unit. This ensures that the sealing lip always sets itself up in the direction of the drive unit and in the radially outward direction. For example, this also prevents a part of the sealing lip from moving inward in the direction of the plain bearing bush due to frictional forces.

Moreover, according to an example embodiment of the present invention, the damping sleeve of the tolerance compensation element is preferably made from a vibration-damping material, preferably from an elastomer. This makes it possible to reliably reduce a transmission of vibrations between the drive unit and the frame interface, which has an especially advantageous mechanical and acoustic effect on an operation of the drive unit.

The plain bearing bush preferably has a plurality of grooves in its outer periphery, the grooves being aligned in parallel with the longitudinal direction, in particular in parallel with the axial direction, of the plain bearing bush. More specifically, a subregion of the damping sleeve of the tolerance compensation element is situated in each groove. In this way, it is possible for the damping sleeve to be held on the outside of the plain bearing bush in an especially reliable manner and, for example, to ensure that it is unable to execute a relative shift in the circumferential direction.

Especially preferably, according to an example embodiment of the present invention, the drive unit has a through hole. The holding device has a through bolt which is pushed through the through bore. In particular, the through bolt thus retains the drive unit on each of the two walls. For one, this allows for an especially simple assembly and disassembly of the drive system on or from the frame interface. For example, the through bolt can be operated from the side of one of the two walls, that is, be inserted, rotated, or pulled out. This is especially advantageous because of the restricted accessibility on the side of the chainring when used in an electric bicycle. The operability of the through bolt may correspondingly be provided on the opposite side. In addition, the use of a through bolt having a relatively large diameter can achieve a particularly robust connection, especially with regard to lateral loads. For instance, sliding of a screwed joint is also able to be avoided in this way.

The through bolt is preferably fixed in place on the second wall. In the process, the through bolt tensions the two sleeves and the second wall with respect to one another. The through bolt especially tensions the two sleeves between a bolt head which particularly forms the part of the holding device situated inside the tolerance compensation element, and the second wall.

Especially preferably, according to an example embodiment of the present invention, the through bolt is embodied as a screw and screwed into an internal thread of the second wall. This provides a particularly simple, economical and—due to fewer components—light-weight drive system.

The through bolt is preferably developed as a screw and screwed into a nut which is situated on the second wall. A robust screwed joint can be provided in this way because the through bolt and the nut may be produced from a harder material than the frame interface, for instance. The use of through bolts and nuts made of steel, for example, allows for the use of a particularly high torque for the screwed connection. Moreover, a simple exchange of the nut is possible in the event of damage to the internal thread. In addition, the use of a nut has the further advantage that the nut provides a tolerance compensation relative to the wall opening of the first wall by a radially predefined play, and thus is always exactly aligned.

The nut is preferably situated in a recess of the second wall in a torsionally fixed manner. For instance, the nut and recess may have a non-circular geometry such as in the form of tangential flattened regions, in particular with respect to an axis of a through opening through the second wall. In this way, a particularly uncomplicated mounting of the drive system is achievable.

In addition, the holding device preferably has two screws which are situated on a common screw axis. The drive unit is fixed in place on one of the two walls with the aid of the two screws. The drive unit is preferably firmly screwed together with the second wall by the individual screw. The other screw is particularly retained on the side of the first wall with the aid of the tolerance compensation element so that an axial movement is possible. In this way, an alternative, advantageous affixation of the drive unit on the frame interface is able to be provided.

In addition, according to an example embodiment of the present invention, the drive system preferably includes two sleeves, which are inserted into an opening of the drive unit on both sides. The openings, for instance, may be oppositely situated axial ends of the through bore through the drive unit. Each sleeve has a shaft and a flange. The shaft preferably has a hollow-cylindrical development, and the flange is preferably situated at an axial end of the shaft and has a larger outer diameter than the shaft. The shaft is at least partially situated inside the opening of the drive unit, and the flange is situated outside the opening. More specifically, the flange is developed so that it is able to be placed against an end face of the drive unit surrounding the opening and can precisely define an insertion depth of the shaft of the sleeve. This makes it possible to adjust the desired mechanical loading in an especially simple and precise manner. Because of the sleeves, a desired loading state of the drive unit can be optimally adjusted. For instance, a neutral installation state of the drive unit in which no axial forces act on the drive unit is able to be provided by an appropriate configuration of the sleeves. As an alternative, for example, the sleeves may be designed in such a way that a slight or strong compressive stress of the drive unit acts in an axial direction through the tensioning with the aid of the holding device, which may have an advantageous effect on a tightness of the drive unit with regard to a fluid entry.

It is particularly advantageous if the flange of the sleeves can be provided with different thicknesses, especially with regard to the axial direction of the sleeve. For instance, the flange of a sleeve of a first embodiment may have a first thickness, the flange of a sleeve of a second embodiment may have a second thickness which is at least 1.5 times, preferably at least two times, and preferably at least three times greater than the first thickness. This offers the advantage that the width of the drive system, preferably measured along an axial direction of the through bore, is variable in an especially simple and cost-effective manner. For instance, by varying the thickness of the flanges of the sleeves, the width of the drive system can be adapted to differently wide frame interfaces, so that the drive system is able to be used in an especially flexible and economical manner.

Especially preferably, according to an example embodiment of the present invention, each sleeve has a damping element, which is situated on a side of the flange facing the drive unit. The damping element is made from a vibration-damping material. The damping element is preferably made from an elastomer. The damping element generates a certain damping effect by an elastic deformability between the flange and drive unit. This makes it possible to configure the drive system in a simple and cost-effective manner so that the drive unit is able to be retained, e.g., without play, between the two walls of the frame interface through a deformation or partial sealing under pressure of the damping element. In addition, the damping element can reduce a transmission of oscillations and vibrations between the drive unit and frame interface. In an advantageous manner, the damping element furthermore induces a sealing effect between the sleeve and drive unit.

In addition, the damping element preferably surrounds a shaft at least partially, preferably completely, in the circumferential direction. The damping element is therefore particularly developed as an extrusion coating of the shaft and of the side of the flange facing the shaft. The damping element thus offers the advantage of an affixation of the drive unit on the frame interface that is optimized with regard to vibration mechanics. This has an especially advantageous effect on a durability of screw joints since the vibration-damping effect reduces especially a transmission of oscillations and vibrations and also alternating dynamic loads because of the elastic and damping characteristics of the damping element. As a consequence, a variable mechanical loading of the screw joint is reduced or prevented as well so that a high durability is able to be provided. This can also reduce the occurrence of undesired noise, for instance. Moreover, the damping element allows for a certain tolerance compensation. In addition, there is the advantage of additional protection from corrosion, in particular galvanic corrosion, for instance if the drive unit has a housing made of aluminum or magnesium, the sleeves being formed from steel, for example. An axial and radial sealing effect can also be provided for the drive unit.

Moreover, the openings of the drive unit are preferably developed as a shared through bore. The two sleeves are configured in such a way that they are situated at a predefined axial distance from each other in a state when they are fully inserted into the through bore and simultaneously in a non-tensioned state inside the through bore. In other words, a sum of the axial lengths of the sleeves, once they are inserted into the through bore without tensioning, is less than an entire total length of the through bore.

According to an example embodiment of the present invention, the predefined axial clearance is preferably configured in such a way that in the tensioned state of the sleeves, which is induced by the holding device, the axial clearance is compensated due to an elastic deformation of the damping element. That means that the sleeves touch each other inside the through bore. In other words, the two sleeves are configured in such a way that, in the tensioned state when the two sleeves touch each other inside the through bore, the respective damping element of the two sleeves is elastically deformed, in particular press-fitted between the flange and the drive unit. This makes it especially easy to adjust a predefined load state of the drive unit with a low predetermined compressive stress. Sealing with the aid of the deformed or press-fitted damping element is reliably ensured in addition. Moreover, because the sleeves touch each other, an absorption of the axial mechanical forces via the sleeves is still ensured so that, for instance, a screw joint using a through bolt is possible with high torque without the occurrence of an excessive mechanical loading of the drive unit. At the same time, an especially stable screw joint is possible as a result.

In addition, the shaft of each sleeve preferably has a compression zone. A press fit is developed between the compression zone and the corresponding opening of the drive unit. An especially reliable and defined support and force transmission is therefore possible between the sleeves and drive unit.

The compression zone is preferably situated so that it abuts the flange, in particular directly. Preferably, the shaft of each sleeve additionally includes a tapered region, which has a smaller outer diameter than the compression zone. Therefore, the tapered region is situated on a side of the compression zone that lies opposite the flange. This makes it possible for the tapered region to be inserted into the through bore of the drive unit in an easy and smooth manner so that an uncomplicated insertion of the sleeves into the through bore is possible.

In addition, the flange preferably has at least one sleeve of a predetermined thickness, in particular in the direction parallel to a longitudinal direction of the sleeve, which is essentially equal to a wall thickness of the shaft, in particular in a radial direction. As an alternative, the flange of at least one sleeve preferably has a predetermined thickness, in particular in a direction parallel to a longitudinal direction of the sleeve, which amounts to at least 1.5 times, preferably two times, and especially preferably to at least three times the wall thickness of the shaft, in particular in a radial direction. As a result, a variable width of the drive system, which allows for an adaptation to frame interfaces of different widths in a simple and cost-effective manner, is able to be provided.

The drive unit preferably has a motor and/or a gear unit. Because of the special positioning and retaining between the walls of the frame interface, an optimal, reliable connection featuring an advantageous mechanical force distribution is able to be made available for a long service life of the drive unit.

In addition, a low weight of the drive system can be provided in a simple and cost-effective manner.

In addition, the present invention provides a vehicle, preferably to a vehicle that can be operated by muscular energy and/or motor power, preferably an electric bicycle, which includes the described drive system. The frame interface according to the present invention may be part of a bicycle frame of the vehicle, for instance.

According to an example embodiment of the present invention, the vehicle preferably includes a vehicle frame. The frame interface of the drive system is an integral part of the vehicle frame, which means that the vehicle frame is developed together with the frame interface as a single component, the drive unit preferably being directly connected to the frame interface, i.e., especially without additional interposed components. As an alternative, the frame interface of the drive system and/or one or both walls of the frame interface is/are developed as a component which is separate from the vehicle frame and connected, in particular screwed together, with the vehicle frame. For example, an indirect fastening of the drive unit to the frame interface may be implemented in this way.

Especially preferably, the vehicle furthermore includes a chainring, which is connected to an output shaft of the drive unit. The second wall of the drive system is situated on the side of the chainring. Especially when an affixation on the second wall is developed as a fixed bearing and an affixation on the first wall is developed as a floating bearing, this allows for an optimal direct force transmission between the drive unit and chainring. A precise positioning of the chainring, i.e., a precise catenary curve, is ensured in addition.

BRIEF DESCRIPTION OF THE DRAWINGS

In the following text, the present invention will be described based on exemplary embodiments in conjunction with the figures. Functionally identical components have been denoted by the same reference numerals in the figures.

DETAILED DESCRIPTION OF EXAMPLE EMBODIMENTS

Figure 1:
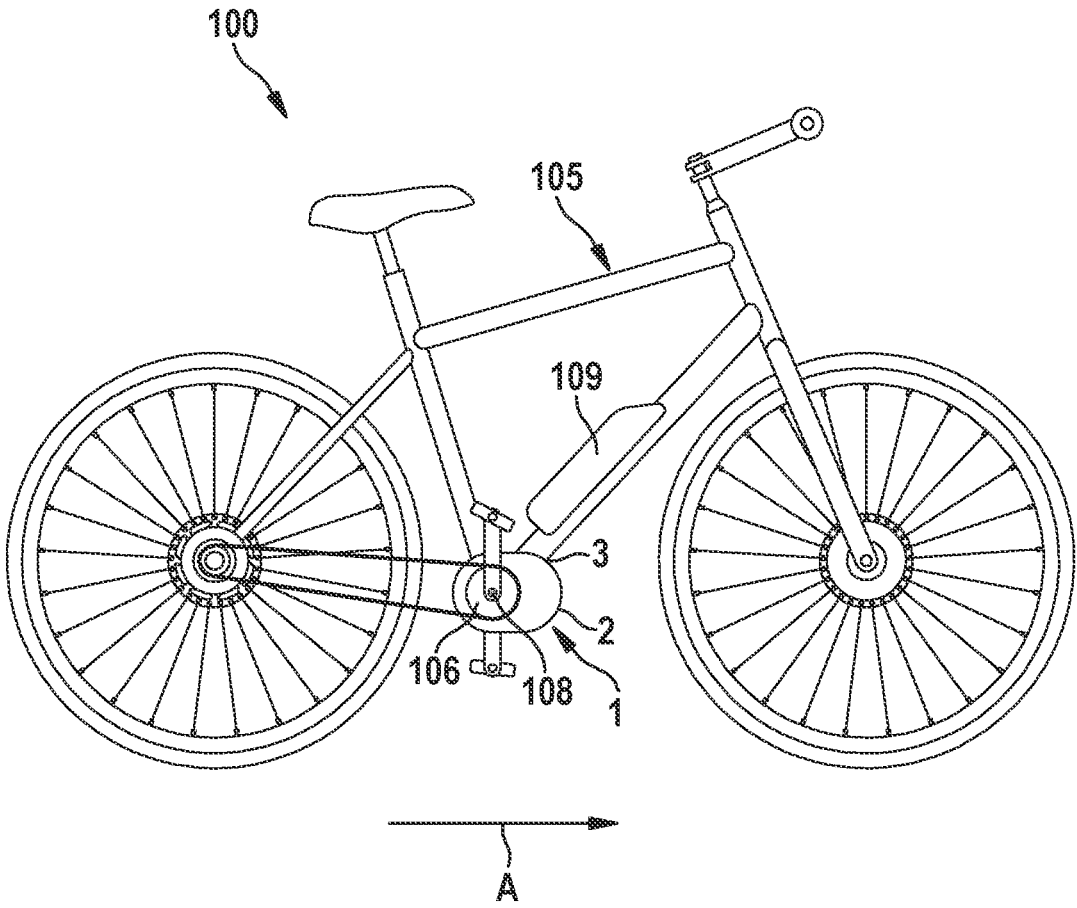
FIG. 1 shows a simplified schematic view of a vehicle having a drive system according to a first exemplary embodiment of the present invention.

FIG. 1 shows a simplified schematic view of a vehicle 100 operable using muscular energy and/or motor power, which has a drive system 1 according to a first exemplary embodiment of the present invention. Vehicle 100 is an electric bicycle. Drive system 1 is disposed in the region of a bottom bracket and includes a drive unit 2. Drive unit 2 includes an electric motor and a gear unit and is provided to supplement a pedaling force of the driver generated by muscular energy with torque generated with the aid of the electric motor. Drive unit 2 is supplied with electric energy by an electric energy store 109.

Figure 2A:
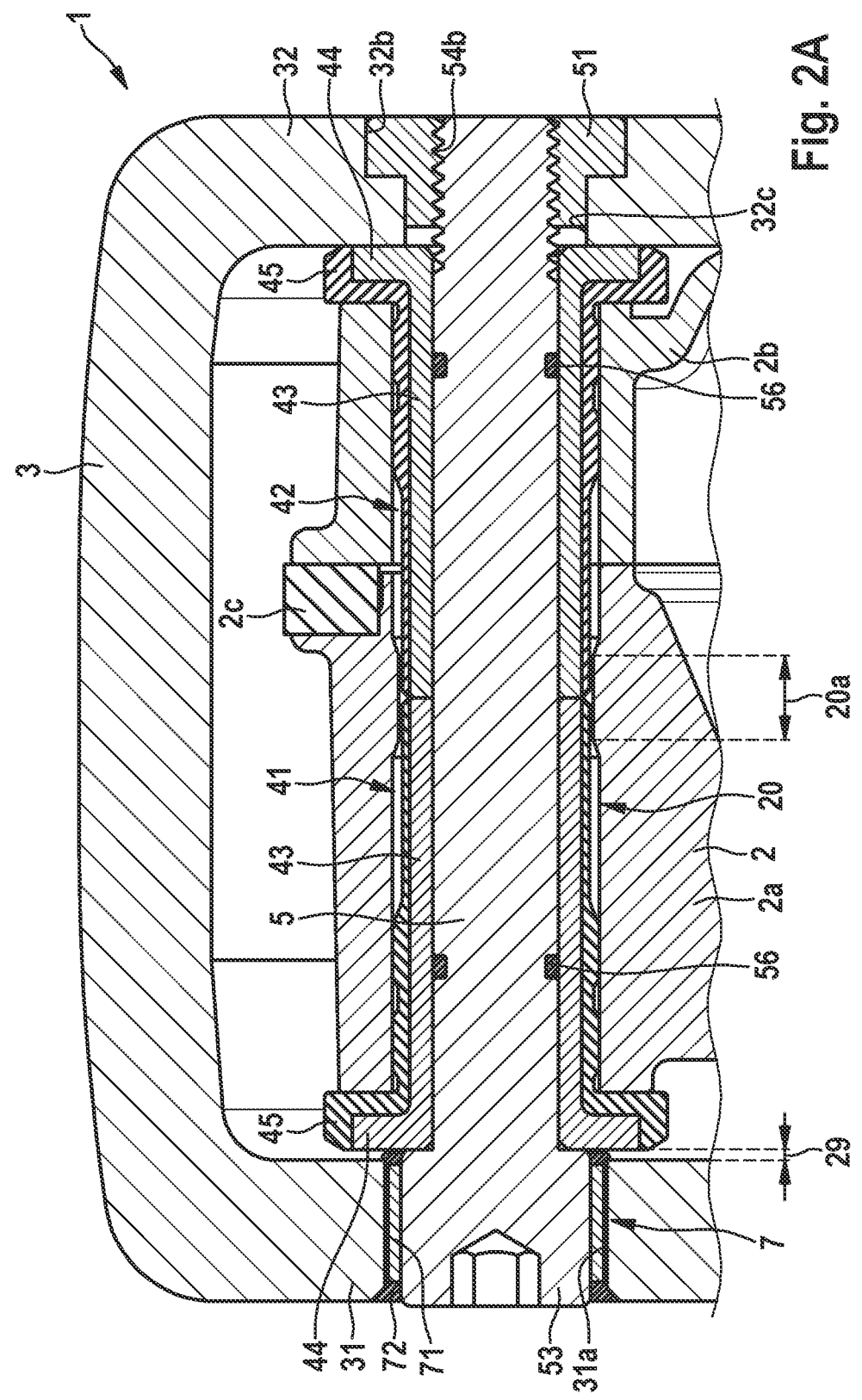
FIG. 2A shows a sectional view of the drive system of FIG. 1 in a completely screw-fitted state.

Drive system 1 of the first exemplary embodiment is shown in FIG. 2A in a sectional view. Drive system 1 includes a U-shaped frame interface 3 which partially accommodates drive unit 2 on the inside. Frame interface 3 is an integral part of a vehicle frame 105 of vehicle 100 (see FIG. 1). Frame interface 3 has a first wall 31 and a second wall 32, between which drive unit 2 is disposed. First wall 31 and second wall 32 are connected to one another via a connecting wall 33 and thus developed as a joint single-piece component.

Drive unit 2 is fastened to frame interface 3 with the aid of a bolt connection, which will be described in greater detail in the following text.

More specifically, drive unit 2 has a through bore 20 which completely penetrates drive unit 2 in a transverse direction. Through bore 20 is particularly developed in a housing, which is preferably made of aluminum or magnesium, of drive unit 2. The housing of drive unit 2 may have a bipartite development, and a housing seal 2c is disposed between the two housing halves 2a, 2b.

Two sleeves 41, 42 are inserted into through bore 20. The two sleeves 41, 42 are inserted into through bore 20 starting from one side in each case, that is, at an axial end of through bore 20. Sleeves 41, 42 are preferably made from aluminum or steel.

Each sleeve 41, 42 has a shaft 43, which is developed in an essentially hollow-cylindrical form and inserted into through bore 20, and a flange 44. Flange 44 is situated outside through bore 20 and has a larger outer diameter than shaft 43.

Shaft 43 has a compression zone 43a, which directly abuts flange 44. Compression zone 43a is developed in such a way that a press fit, that is, an interference fit, is developed between compression zone 43a and through bore 20.

A tapered region 20a is centrically developed in through bore 20, in which an inner diameter of the through opening 20 is tapered. A clearance fit is preferably developed between tapered region 20a and sleeves 41, 42. In this way, tapered region 20a induces centering of sleeves 41, 42 and thus an especially precise positioning of sleeves 41, 42.

Both sleeves 41, 42 preferably have an identical development for an uncomplicated and economical production.

Axial lengths of sleeves 41, 42, especially of shaft 43, are configured in such a way that sleeves 41, 42 touch in the inserted and completely screw-fitted state (as described later) inside through bore 20.

In addition, drive system 1 includes a through bolt 5, which is passed through through bore 20 and the two sleeves 41, 42. Through bolt 5 is embodied as a screw and has a bolt head 53 at one axial end and an external thread 54 at the other axial end, the external thread 54 extending only across a subregion of through bolt 5.

Through bolt 5 is screwed into a nut 51 on second wall 32 with the aid of external thread 54. Bolt head 53 is situated on the side of first wall 31 and rests against an outer side of first wall 31, in particular.

An interference fit is preferably developed between through bolt 5 and an inner through opening of sleeves 41, 42 in each case to provide a simple insertion option. In the regions of through bolt 5 inside each sleeve 41, 42, a seal such as an O-ring seal 56, is preferably situated between through bolt 5 and sleeve 41 or 42 in order to prevent fluid from entering the interior of sleeves 41, 42 and the interior of through bore 20.

Through bolt 5 is screwed in in such a way that it tensions the two sleeves 41, 42 in an axial direction of through bolt 5 with respect to second wall 32. Sleeves 41, 42 ensure that this tensioning does not lead to any, or to a precisely defined, compressive stress of drive unit 2 in an axial direction between flanges 44 and the two sleeves 41, 42. The two sleeves 41, 42a, in particular, make it possible to avoid tensile stressing of drive unit 2.

The special bolted connection of drive system 1 offers numerous advantages. For example, the use of through bolt 5 allows for a particularly robust fastening of drive unit 2. More specifically, a screw joint may be implemented with high torque. Since sleeves 41, 42 absorb the compressive forces, an excessive mechanical loading of drive unit 2 is avoided in an especially reliable manner. In addition, with the aid of adapting sleeves 41, 42, a tolerance of drive system 1 can be adjusted in a defined, simple and economical manner. The bolted connection furthermore allows for an especially simple installation of drive system 1 because the insertion of through bolt 5 and an operation of through bolt 5 for the screw-in operation can be carried out only from one side, i.e., from the side of first wall 31. This is especially advantageous if the accessibility is restricted on the side of second wall 32, for instance because a chainring 106 (see FIG. 1) is situated on this side.

Each sleeve 41, 42 additionally includes a damping element 45, which is made from an elastic and vibration-damping material. More specifically, damping element 45 is made from an elastomer. In detail, a radially outer external side of shaft 43, of flange 44, and the particular side of flange 44 pointing to drive unit 2, is covered or coated by damping element 45.

Thus, damping element 45 is preferably developed in the form of an extrusion coating of sleeve 41, 42.

Figure 2B:
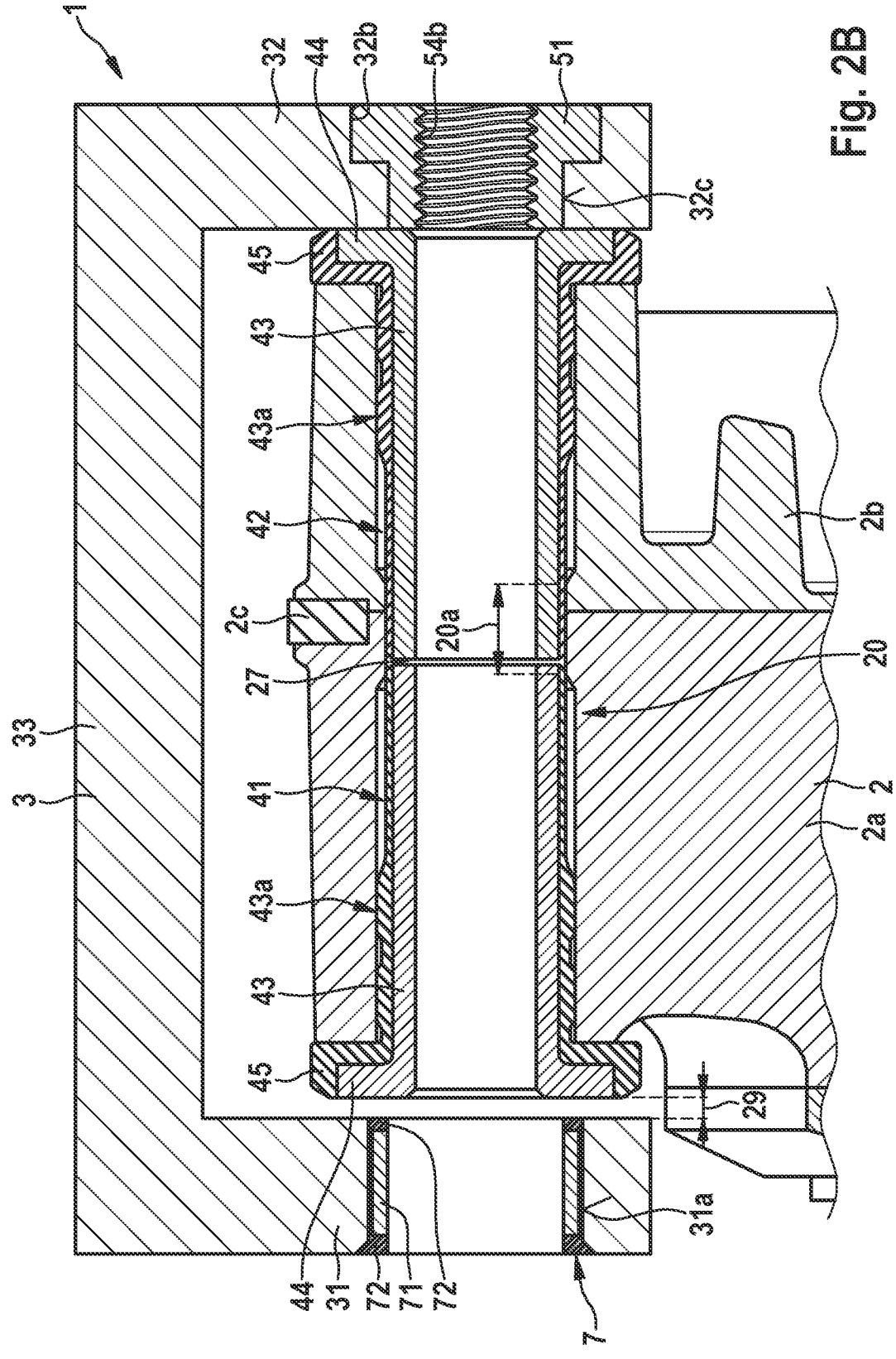
FIG. 2B shows a sectional view of the drive system of FIG. 1 prior to the screwed connection.

In addition, the axial lengths of shafts 43 of sleeves 41, 42 are developed in such a way that, in a state fully inserted into through opening 20 and still not tensioned by through bolt as illustrated in FIG. 2B, a predefined axial clearance 27, i.e., a gap, exists between the two sleeves 41, 42 in the interior of through opening 20. Here, a state is viewed in which the two sleeves 41, 42 are not tensioned but damping element 45 rests against drive unit 2 in the region of each flange 44 of each sleeve 41, 42. In particular, the axial lengths of the two shafts 43 are smaller, by a predetermined difference, than one half of the axial length of through opening 20, the predetermined difference being smaller than twice the thickness of one of damping elements 45 in the region of flange 44.

When completely screwed together, as illustrated in FIG. 2A, a predefined gap 29 is present between first wall 31 and first sleeve 41.

Because of this special coordination of the lengths of the two sleeves 41, 42 and through hole 20, it is achieved that the part of damping element 45 of each sleeve 41, 42 situated between flange 44 and drive unit 2 is partially compressed or clamped between flange 44 and drive unit 2 and elastically deformed as a result by the tensioning with the aid of through bolt 4.

Damping elements 45 and the corresponding configuration of sleeves 41, 42 with an axial clearance in a non-tensioned state cause a slight compressive stress to be exerted on drive unit 2 in the tensioned state. This may have an advantageous effect on the tightness of drive unit 2 itself. In addition, especially reliable sealing between sleeves 41, 42 and drive unit 2 is possible because of the elastic deformation of damping elements 45.

Also shown in FIG. 1 is an output shaft 108 of drive unit 2, which is connected in a torsionally fixed manner to a chainring 106. Output shaft 108 can be driven by the muscular energy of the driver on the one hand and by the motor power of drive unit 2 on the other hand. As may be gathered from FIG. 1, chainring 106 is situated on the side of second wall 32. As mentioned above, this results in an advantageous accessibility and a simplified installation of drive system 1. This also results in the advantage of a direct force transmission between output shaft 108 and frame interface 3, which can be absorbed in an especially satisfactory manner because of the higher mechanical forces on the chainring side by the direct and robust connection with the aid of second wall 32. Moreover, this ensures a defined position of chainring 106 in relation to an axial direction of output shaft 108 and relative to frame interface 3, which provides the advantage of a reliably and precisely situated catenary curve.

The connection of drive unit 2 and frame interface 3 via damping elements 45 further provides the advantage of an oscillation-decoupled mounting of drive unit 2 on vehicle 100. Apart from preventing or reducing the transmission of acoustic oscillations, which has an advantageous effect on a noise reduction while vehicle 100 is in operation, a transmission of mechanical vibrations is reduced or prevented as well. This can prevent or reduce a harmful effect of such oscillations on the screwed connection. In other words, a loosening or undoing of the screwed connection is able to be prevented or reduced. In addition, a certain tolerance compensation such as with regard to a coaxiality of the bores or openings or the like can occur due to the elasticity of damping element 45 itself.

In addition, an axially movable support of through bolt 5 is provided on first wall 31. Bolt head 53 of through bolt 5 is situated inside a wall opening 31a of first wall 31. A deformation of first wall 31 is therefore not provided; in its place, an especially rigid and robust frame interface 3 is able to be provided.

Figure 3:
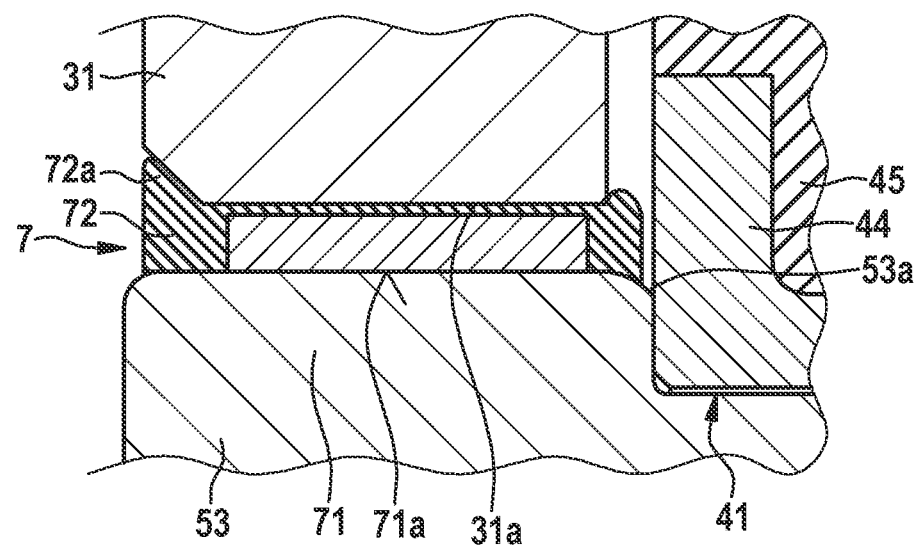
FIG. 3 shows a detail of FIG. 2A.

The axially movable support is achieved with the aid of a tolerance compensation element 7. This support by tolerance compensation element 7 is shown in FIG. 3 in an enlarged view. Tolerance compensation element 7 includes a hollow-cylindrical plain bearing bush 71 and a damping sleeve 72. Damping sleeve 72 is particularly developed from an elastic material, preferably an elastomer. Damping sleeve 72 essentially fully surrounds a radially outer side of plain bearing bush 71, it also being possible to provide recesses (not shown) in damping sleeve 72. In addition, damping sleeve 72 covers both axial end faces of plain bearing bush 71. At the radially inner side, plain bearing bush 71 is exposed so that bolt head 53 can move smoothly and with low friction relative to tolerance compensation element 7.

Plain bearing bush 71 may preferably be developed from a solid material along the circumferential direction or, as an alternative, have a slotted development, that is to say, include a longitudinal slot in an axial direction. In both cases, plain bearing bush 71 is preferably developed in such a way that plain bearing bush 71 is widened in a radial direction when through bolt 5 is screwed in and bolt head 53 thus penetrates plain bearing bush 71, so that a press fit is produced between tolerance compensation element 7 and wall opening 31*a*. This may enable a play-free support of bolt head 53 in a radial direction inside wall opening 31*a*.

Gap 29 between first wall 31 and first sleeve 41 exists both in an unbolted and in a fully bolted state (see FIGS. 1 and 3).

Bolt head 53 preferably has a lead-in chamfer 53*a* (see FIG. 3) on a side pointing toward sleeve 41, which facilitates the insertion and bolting of through bolt 5.

At the two axial ends, damping sleeve 72 has a sealing lip 72*a* in each case, which is developed as a lip that projects both radially inward and radially outward. Because of the elasticity of damping sleeve 72, bolt head 53 forces sealing lips 72*a* radially toward the outside by bolt head 53 when through bolt 5 is screwed in. This results in a reliable and defined seal between first wall 31 and tolerance compensation element 7 as well as between bolt head 53 and tolerance compensation element 7. In addition, sealing lips 72*a* induce an axial form fit of tolerance compensation element 7 with first wall 31. This ensures a reliable and defined positioning of tolerance compensation element 7 relative to first wall 31.

Figure 4:
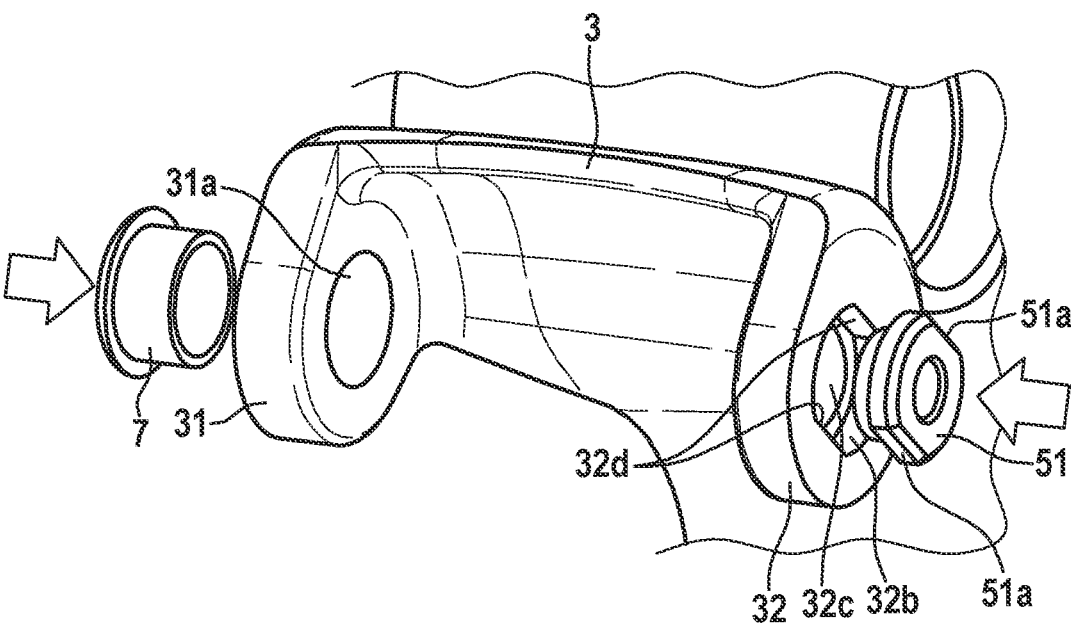
FIG. 4 shows a perspective detail view of an assembly of the drive system of FIG. 2A.

Prior to installing drive unit 2, tolerance compensation element 7, as shown in FIG. 4, may preferably be inserted into wall opening 31*a* of first wall 31 from the outside, i.e., from outside frame interface 3, in particular snapped into place with the aid of a slight form fit by sealing lips 72*a*.

In addition, the screwed connection of through bolt 5 to second wall 32 in the first exemplary embodiment is implemented with the aid of a nut 51. Through bolt 5 is screwed into nut 51 on second wall 32. Nut 51, as preferably also through bolt 5, may preferably be made from steel in order to enable an especially firm screw connection with high torque.

Nut 51 is situated in a torsionally fixed manner in a recess 32*b* of second wall 32. Recess 32*b* is preferably an outside-situated radial expansion of a circular second wall opening 32*c*, which penetrates second wall 32. As may be gathered from FIG. 4, recess 32*b* has two oppositely situated flattened regions 32*d*, that is, two straight and parallel walls situated in a tangential direction. Nut 51 has a corresponding geometry with two oppositely situated flattened regions 51*a*. Second flattened region 32*d*, 51*a* ensure that nut 51 is unable to twist in second wall 32, e.g., when through bolt 5 is screwed in, so that an especially simple and rapid installation of drive system 1 is possible.

In addition, nut 51 is developed in a T-shape in a sectional view. This makes it possible to provide a maximum thread length at an optimal compactness of entire drive system 1 so that a firm and reliable screwed connection with through bolt 5 can be achieved.

Figure 5:
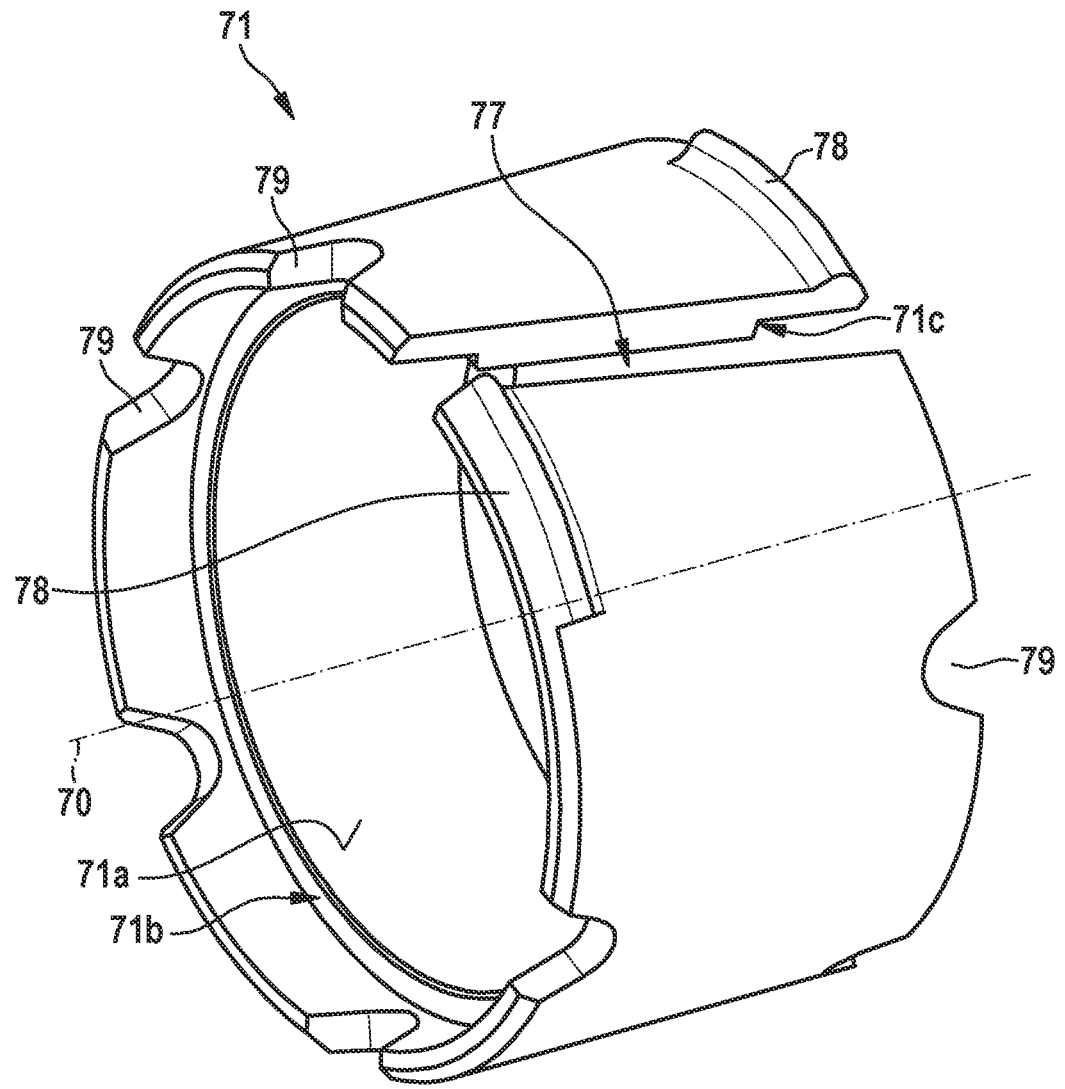
FIG. 5 shows a perspective detail view of a tolerance compensation element of a drive system according to a second exemplary embodiment of the present invention.

FIG. 5 shows a perspective detail view of a tolerance compensation element 7 of a drive system 1 according to a second exemplary embodiment of the present invention. In essence, the second exemplary embodiment corresponds to the first exemplary embodiment of FIGS. 1 through 4, with the difference that plain bearing bush 71 of tolerance compensation element 7 has an alternative development. Plain bearing bush 7 is shown in the perspective view of FIG. 5.

Plain bearing bush 71 has a longitudinal slot 77, which completely penetrates the essentially hollow-cylindrical plain bearing bush 71 in an axial direction and in a radial direction. Longitudinal slot 77 is situated at an angle in relation to a longitudinal axis 70 of plain bearing bush 71, which means it extends along a line that, in a radial projection onto a plane of longitudinal axis 70, is situated at an angle of preferably at least 5°, preferably maximally 45°, to longitudinal axis 70. In this way, it is possible to provide an optimal mechanical support around the entire circumference of plain bearing bush 71 because, for instance, no or only a negligible interruption of the projected contact surface lies between bolt head 53 and first wall 31. For instance, this may allow for a better coaxial positioning accuracy of drive unit 2 relative to frame interface 3.

Plain bearing bush 71 of FIG. 5 furthermore has a detent 78 at each axial end at the outer circumference. Detent 78 is developed as an element which projects from an outer circumference of plain bearing bush 71 and induces a stronger form fit with first wall 31 (see also FIG. 3 in this context). As can be gathered from FIG. 5, one of the two illustrated detents 78 directly abuts longitudinal slot 77, both detents 78 being disposed on opposite sides of longitudinal slot 77 with respect to the circumferential direction in each case. Each of the two detents 78 extends only across a portion of the circumference of plain bearing bush 71. Preferably, it is possible to provide still further (not shown) detents 78 distributed around the circumference of plain bearing bush 71.

Plain bearing bush 71 of FIG. 5 furthermore has at each axial end a plurality of recesses 79 distributed around the circumference, which essentially have a U-shaped development and completely penetrate plain bearing bush 71 in a radial direction. With the aid of recesses 79, more material of damping element 72 may be available, which connects the layer of damping element 72 located at the outer circumference of plain bearing bush 71 with the radially inner layer. In this way, an optimal connection of plain bearing bush 71 and damping element 72 can be established.

The connection of plain bearing bush 71 and damping element 72 is further optimized by steps 71*b* at the inner circumference of plain bearing bush 71. Steps 71*b* are provided as enlargements of the inner diameter of plain bearing bush 71 starting from sliding area 71*a*. That means that the radially inner region of damping element 72 may be situated in steps 71*b*, one of which is situated at an axial end of plain bearing bush 71 in each case.

Figure 6:
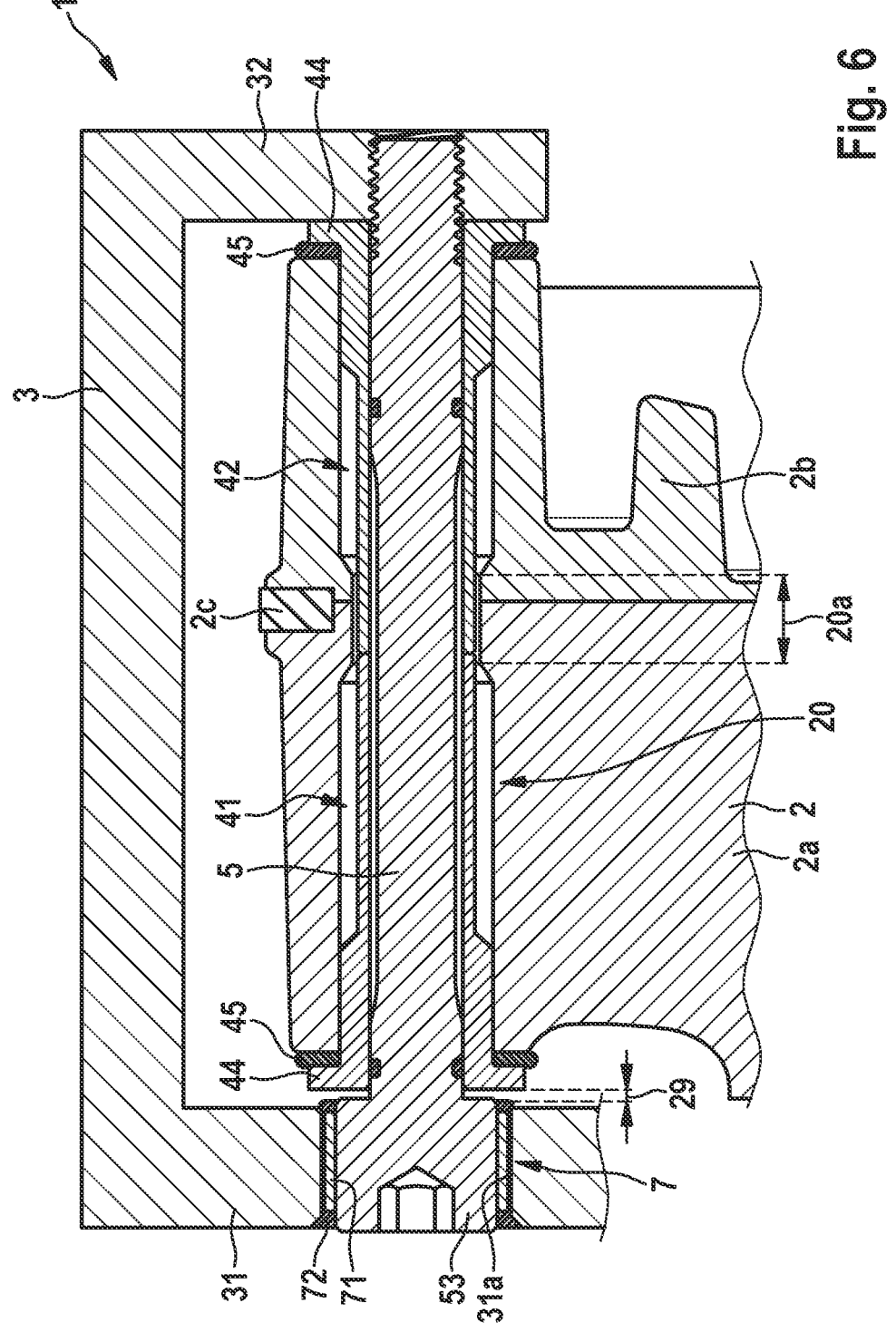
FIG. 6 shows a sectional view of a drive system according to a third exemplary embodiment of the present invention.

FIG. 6 shows a sectional view of a drive system 1 according to a third exemplary embodiment of the present invention. The third exemplary embodiment essentially corresponds to the first exemplary embodiment of FIGS. 1 through 4, with the difference that damping element 45 is positioned only on flange 44 of respective sleeve 41, 42. In other words, damping element is developed in the shape of a disk and positioned solely between the side of flange 44 pointing toward drive unit 2, and drive unit 2.

Figure 7:
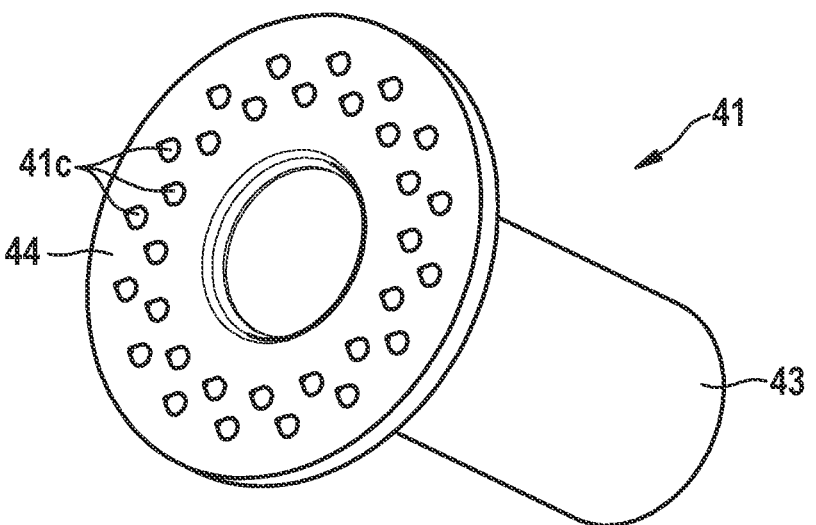
FIG. 7 shows a detail of a drive system according to a fourth exemplary embodiment of the present invention.

FIG. 7 shows a detail of a drive system 1 according to a fourth exemplary embodiment of the present invention. The fourth exemplary embodiment essentially corresponds to the first exemplary embodiment of FIGS. 1 through 4, with the difference of an alternative sleeve 41, 42.

FIG. 7 shows only one of the two sleeves 41, 42, the two sleeves 41, 42 preferably having an identical development. Sleeve 41 is shown in a perspective view in FIG. 8.

Sleeve 41 includes a shaft 43 and a flange 44. Shaft 43 is inserted into through opening 20 of drive unit 2. Flange 44 is provided to rest against an inner side of second wall 32 of frame interface 3 (see FIG. 2A, for instance). Flange 44 of sleeve 41 has a multitude of projecting form-fit elements 41c on the particular side that is assigned to wall 32. Form-fit elements 41c are preferably disposed in one or more circles, preferably two, as shown in FIG. 7, which are concentrically disposed with respect to the through opening of sleeve 41.

Figure 8:
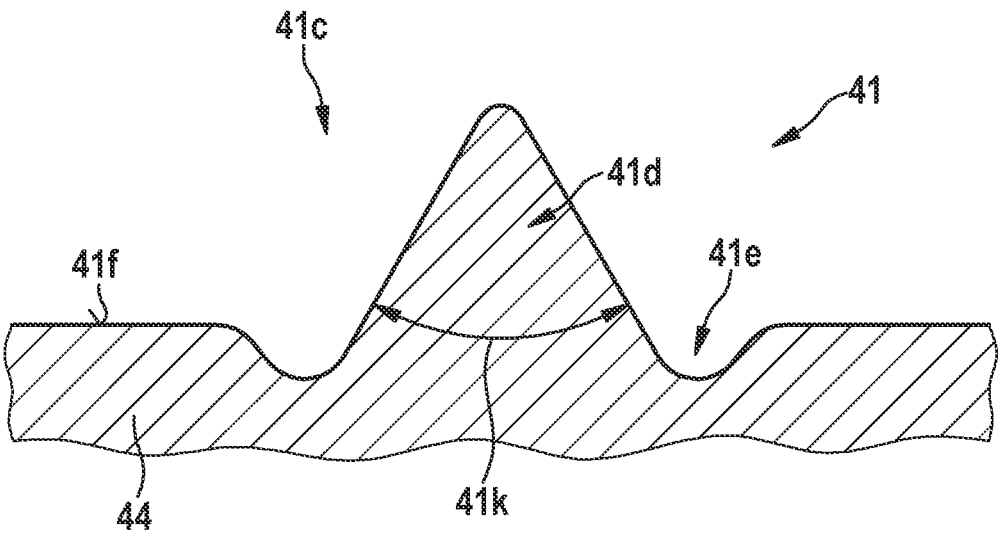
FIG. 8 shows a detail sectional view of FIG. 7.

A single form-fit element 41c of sleeve 41 of FIG. 7 is shown in a detail sectional view in FIG. 8. Each form-fit element 41c has a pyramid 41d which projects from a surface 41f of flange 44. As an alternative, each form-fit element 41c may also have a projecting cone. Pyramid 41d is developed in the form of a straight pyramid and has an opening angle 41k of preferably less than 60°. Pyramids 41d press themselves into the surface of wall 32 when sleeve 41 is screwed together with wall 32, and thus plastically deform the surface. This produces a micro form fit between sleeve 41 and wall 32 in a plane perpendicular to the screw axis, so that an especially firm connection between drive unit 2 and frame interface 3 can be realized. Slippage of drive unit 2 relative to frame interface 3 is reliably preventable in this way.

In addition to pyramid 41d, each form-fit element 41c has a depression 41e, which is developed at an outer circumference of pyramid 41d and in surface 41f of flange 44. Depression 41e, for instance, is able to accommodate material of wall 32 displaced by the penetration of pyramid 41d into wall 32 so that wall 32 and flange 44 may reliably rest on top of one another in a planar and precise manner. For instance, one depression 41e per pyramid 41d may be provided, which partially or fully encloses pyramid 41d. As an alternative, a single depression 41e may be developed in surface 41f of flange 44, on whose radial inner side and/or outer side pyramids 41d are situated.

Figure 9:
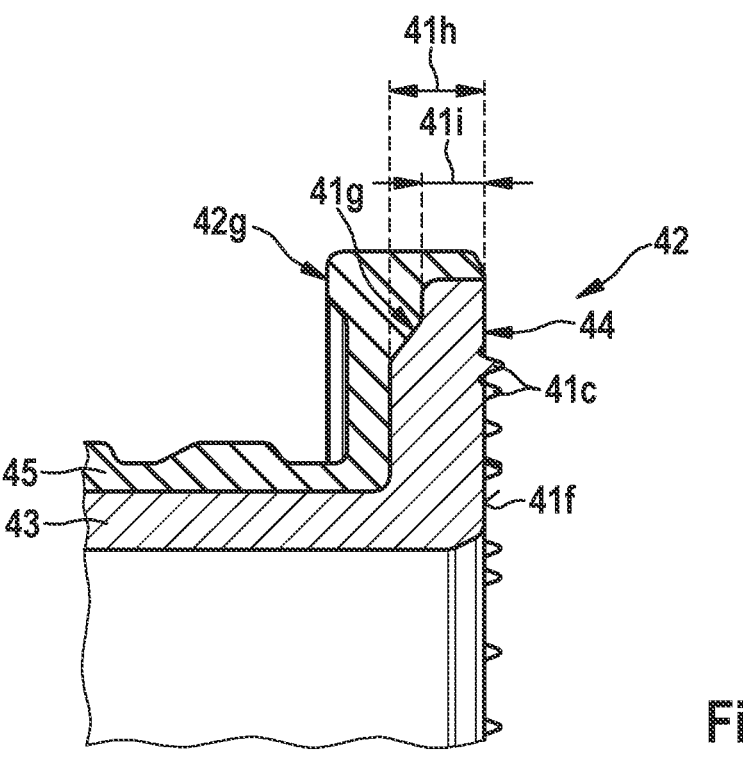
FIG. 9 shows a detail sectional view of a drive system according to a fifth exemplary embodiment of the present invention.

FIG. 9 shows a detail sectional view of a drive system 1 according to a fifth exemplary embodiment of the present invention. Only one of sleeves 41, 42 is shown in FIG. 9, that is, sleeves 42 on the side of second wall 32. First sleeves 41 on first wall 31 preferably have an identical development. The fifth exemplary embodiment essentially corresponds to the first exemplary embodiment of FIGS. 1 through 4, with the difference of an alternative development of sleeve 42 in the region of flange 44. At a radially outer end of flange 44, sleeve 42 has a taper 41g on the side of flange 44 facing shaft 43. Taper 41g is developed in such a way that a difference between maximum thickness 41h and a minimum thickness 41i of flange 44 corresponds to at least 50%, preferably maximally 150%, of a wall thickness 43d of shaft 43 of sleeve 42. The thicknesses are viewed along a direction parallel to a longitudinal axis of sleeve 42.

Damping element 45 is developed in such a way that it compensates for taper 41g of flange 44. In addition, damping element 45 has a thickening 42g at a radially outermost end. As a result, an especially thick damping element 42 is obtained at the radially outer end of flange 44. This has an advantageous effect on an optimal seal between sleeve 42 and drive unit 2.

Figure 10:
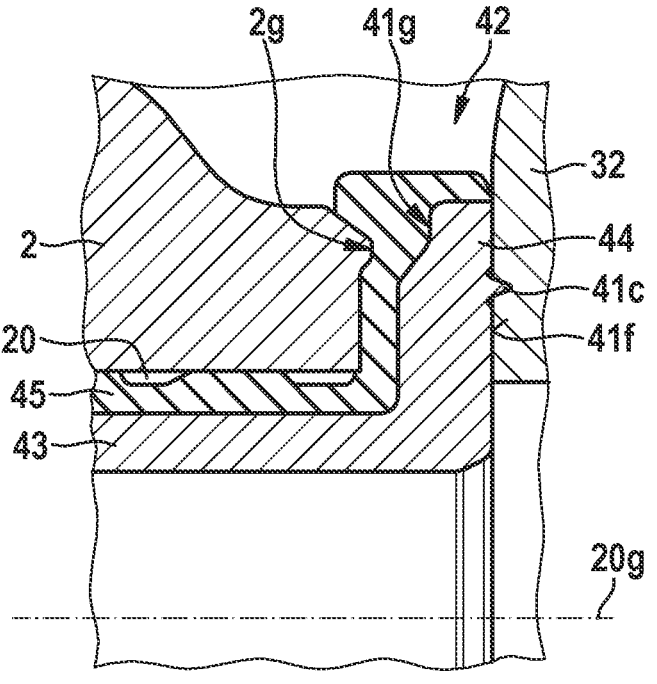
FIG. 10 shows a further detail sectional view of the drive system of FIG. 9.

This seal is additionally aided by a projecting ring fin 2g of drive unit 2, which is provided in the fifth exemplary embodiment, as illustrated in FIG. 10. Projecting ring fin 2g has a trapezoidal cross-section and is situated concentrically to through opening 20 of drive unit 2. In a state when sleeve 42 is pressed into through opening 20, projecting ring fin 2g and taper 41g of sleeve 42 lie on the same radius with respect to opening axis 20g of through opening 20. As a result, projecting ring fin 2g dips into the soft zone of damping element 45 in the region of taper 41g when sleeve 42 and drive unit 2 are pressed against each other in the completely bolted state. Optimal sealing at drive unit 2 is able to be achieved in this way by the elasticity of damping element 45.

Figure 11:
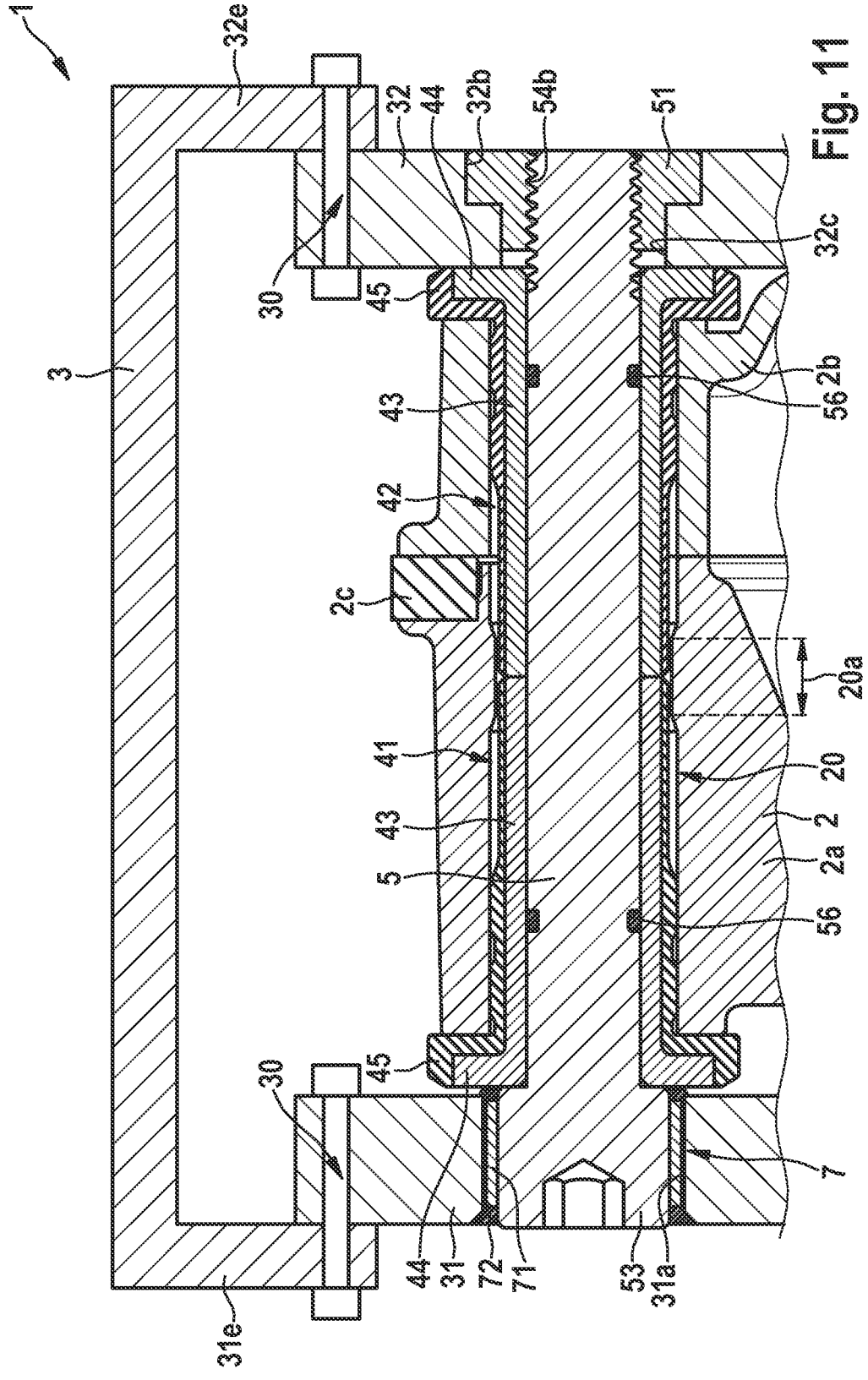
FIG. 11 shows a sectional view of a drive system according to a sixth exemplary embodiment of the present invention.

FIG. 11 shows a sectional view of a drive system 1 according to a sixth exemplary embodiment of the present invention. The sixth exemplary embodiment essentially corresponds to the first exemplary embodiment of FIGS. 1 through 4, with the difference that drive unit 2 is indirectly screwed to frame interface 3. Specifically, the two walls 31, 32 to which drive unit 2 is bolted are developed as components that are separate from frame interface 3. For instance, walls 31, 32 may be developed as retaining plates. Walls 31, 32 may be connected to frame walls 31e, 32e of frame interface 3 with the aid of additional screwed joints 30 and/or welded joints (not shown). In this way, especially high flexibility of drive system 1 is able to be provided.

Figure 12:
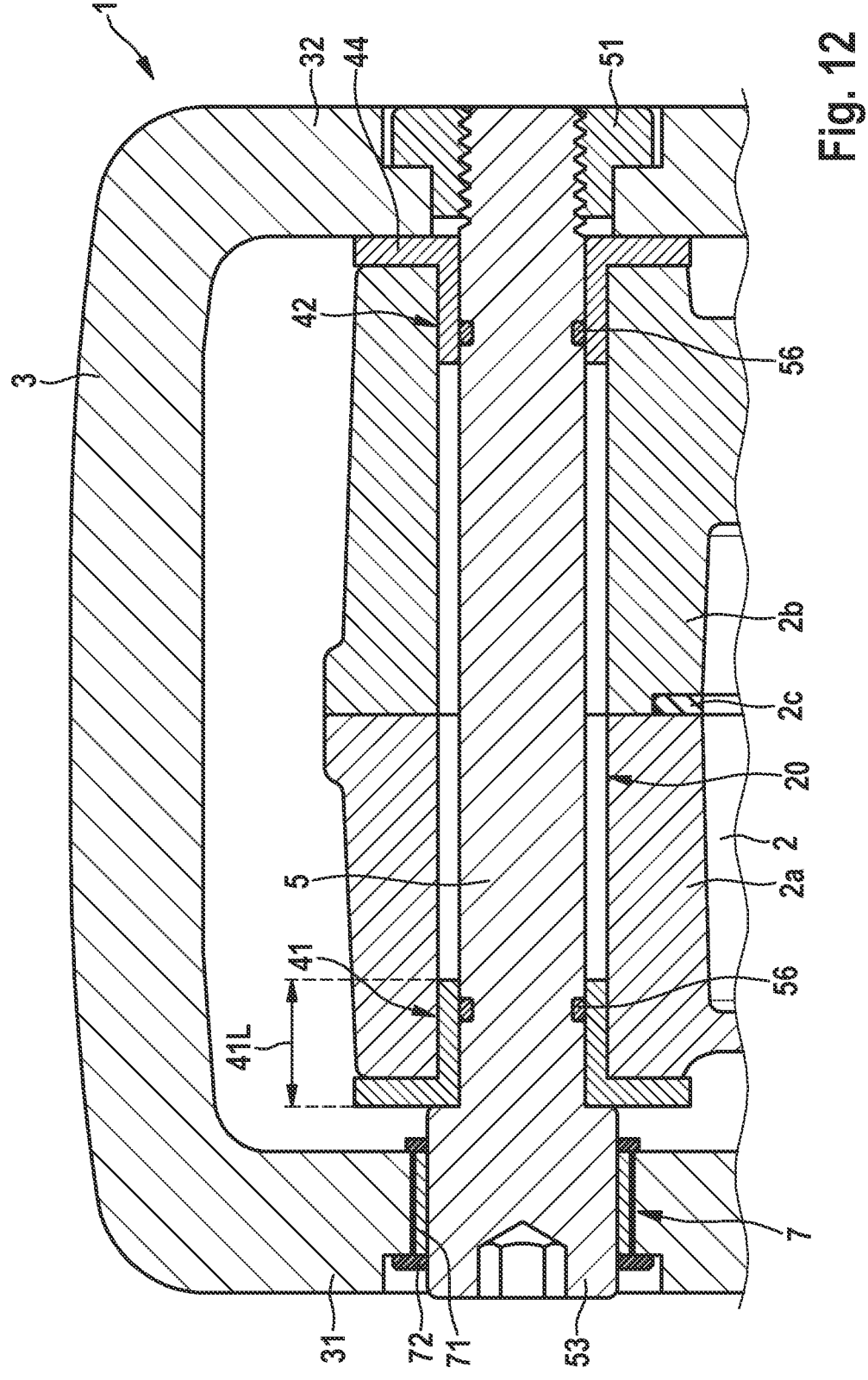
FIG. 12 shows a sectional view of a drive system according to a seventh exemplary embodiment of the present invention.

FIG. 12 shows a sectional view of a drive system 1 according to a seventh exemplary embodiment of the present invention. The seventh exemplary embodiment essentially corresponds to the first exemplary embodiment of FIGS. 1 through 4, with the difference of an alternative development of sleeves 41, 42. In the seventh exemplary embodiment of FIG. 12, both sleeves 41, 42 are developed as shortened metal sleeves that can be produced in an especially simple and economical manner. Sleeves 41, 42 are developed in such a way that they do not touch each other inside through bore 20. In addition, the two sleeves 41, 42 have a short axial length 411, which is smaller than an inner diameter of through bore 20, for instance. This makes it possible to save material and it allows for an easier press-fitting of sleeves 41, 42 in through bore 20 because only a short press length exists. Drive system 1 of the seventh exemplary embodiment thus enables a particularly simple and cost-effective construction.

Figure 13:
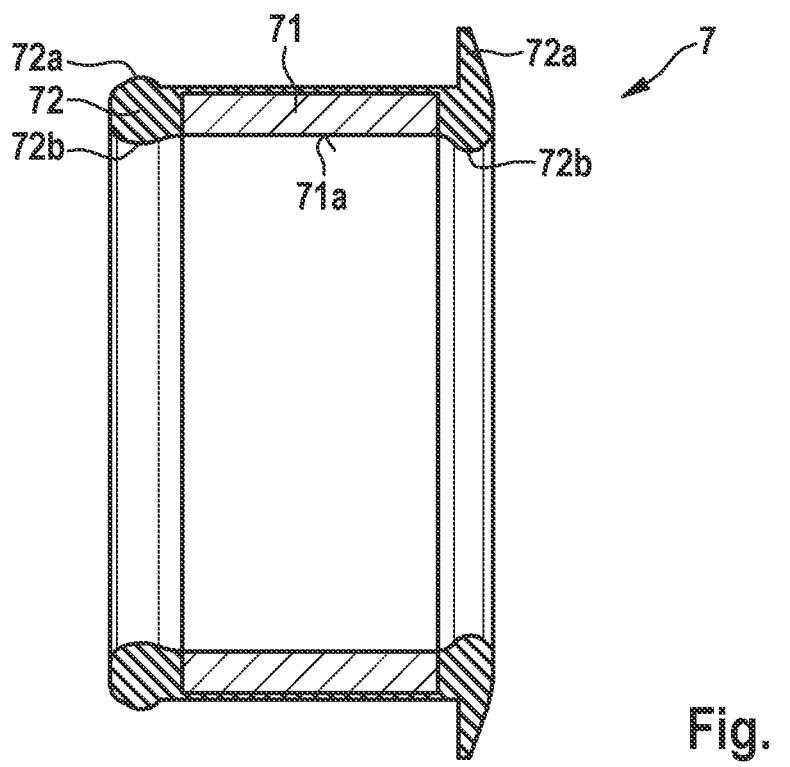
FIG. 13 shows a sectional view of a tolerance compensation element of a drive system according to an eighth exemplary embodiment of the present invention.

FIG. 13 shows a sectional view of a tolerance compensation element 7 of a drive system according to an eighth exemplary embodiment of the present invention. The eighth exemplary embodiment essentially corresponds to the first exemplary embodiment of FIGS. 1 through 4, with the difference that damping sleeve 72 of tolerance compensation element 7 has sealing lips both radially inside and radially outside and at both axial ends. More specifically, radially outer sealing lips 72 are provided, as in the first exemplary embodiment (compare FIG. 3). In addition, radially inner sealing lips 72b, which project radially inward beyond sliding surface 71 of plain bearing bush 71, are provided. In this way, particularly reliable sealing is able to be achieved at tolerance compensation element 7, that is, at the first wall opening 31a.

Figure 14:
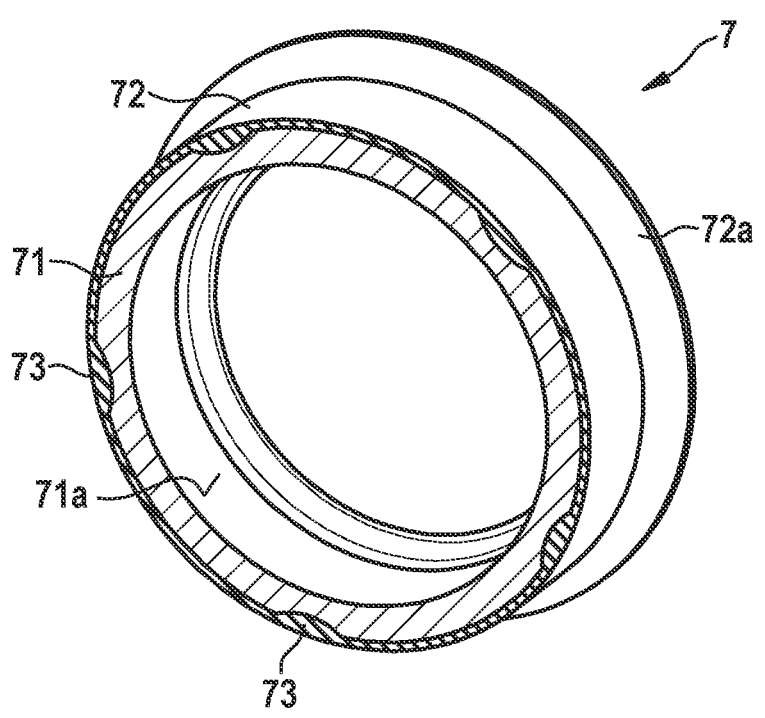
FIG. 14 shows a perspective sectional view of the tolerance compensation element of FIG. 13.

FIG. 14 shows a perspective sectional view of tolerance compensation element 7 of FIG. 13. At its outer circumference, as may be gathered from FIG. 14, plain bearing bush 72 a plurality of grooves 73, which are situated parallel to the longitudinal direction of tolerance compensation element 7. Grooves 73 are evenly distributed about the circumference of plain bearing bush 72. Grooves 73 are occupied by subregions of damping sleeve 72. This makes it possible to provide a particularly good connection between plain bearing bush 71 and damping element 72.

Figure 15:
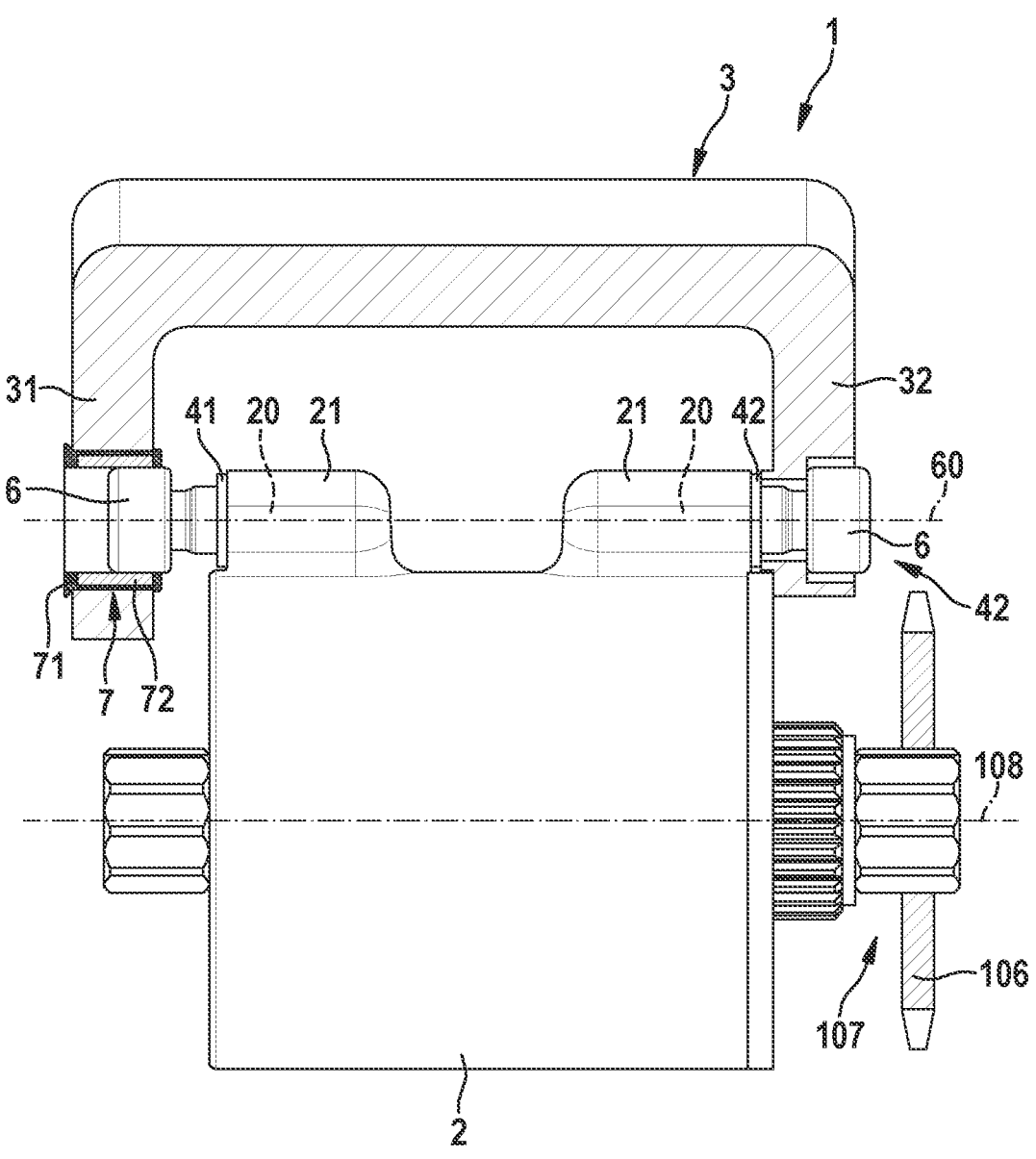
FIG. 15 shows a sectional view of a drive system according to a ninth exemplary embodiment of the present invention.

FIG. 15 shows a sectional view of a drive system 1 according to a ninth exemplary embodiment of the present invention. The ninth exemplary embodiment essentially corresponds to the first exemplary embodiment of FIGS. 1 through 4, with the difference that instead of a through bolt 5, precisely two individual screws are provided. In addition, no through bore 20 but separate openings 20 are provided in drive unit 2, into which sleeves 41, 42 are pressed. Openings 20 are developed in tabs 21 which project from drive unit 2. In the ninth exemplary embodiment, screws 6 are screwed into an internal thread (not shown) of the individual sleeve. The ninth exemplary embodiment of FIG. 15 thus offers an alternative screwed connection possibility, which may be advantageous depending on the space available on the vehicle.

Figure 16:
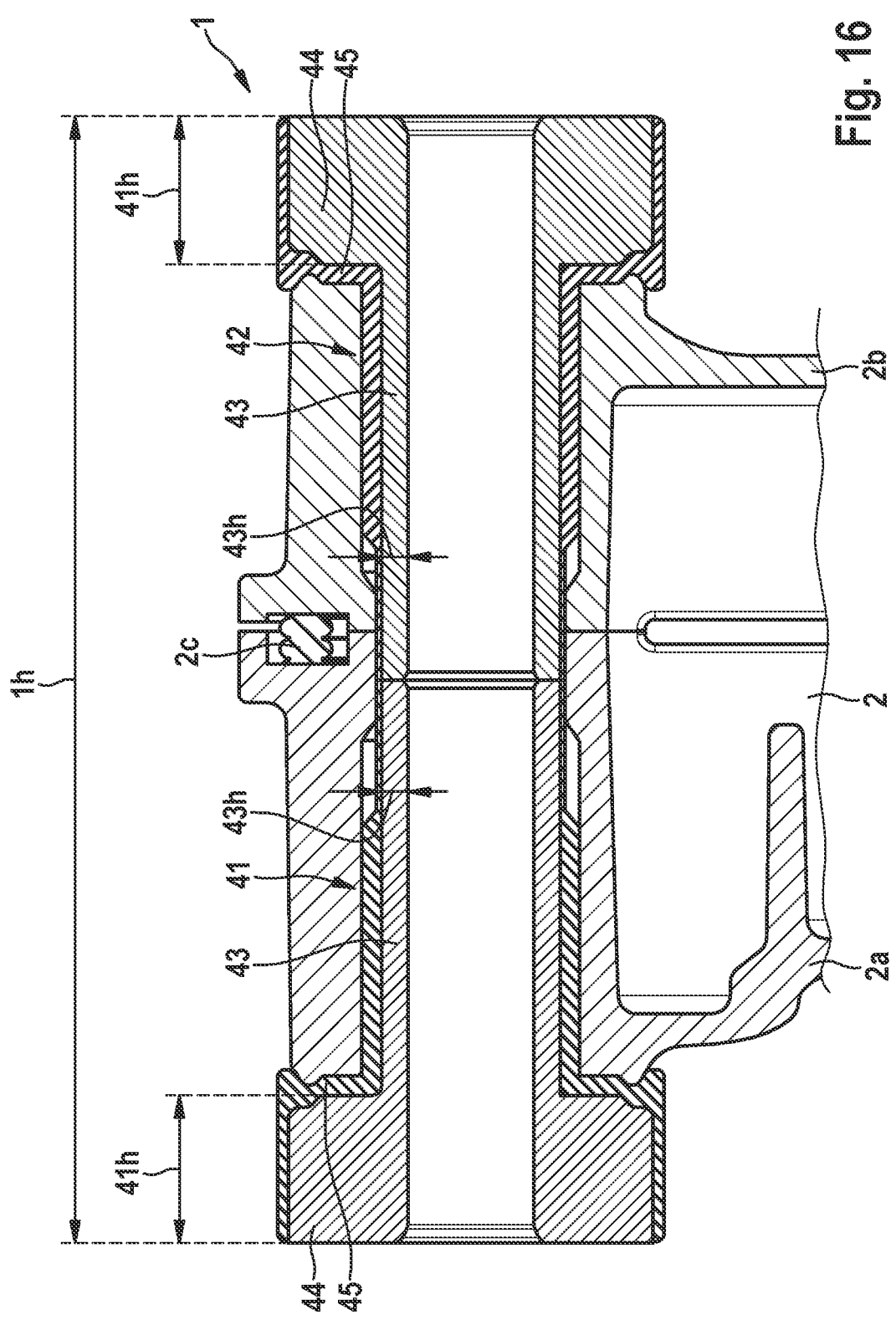
FIG. 16 shows a sectional view of a drive system according to a tenth exemplary embodiment of the present invention.

FIG. 16 shows a sectional view of a drive system 1 according to a tenth exemplary embodiment of the present invention. The tenth exemplary embodiment essentially corresponds to the fifth exemplary embodiment of FIGS. 9 and 10, with the difference that alternative sleeves 41, 42 are used. More specifically, flanges 44 of sleeves 41, 42 in the tenth exemplary embodiment of FIG. 16 have a thicker development than in the fifth exemplary embodiment. In detail, thickness 41$h$ of flanges 44 in the tenth exemplary embodiment is multiple times greater, preferably at least three times greater, than a wall thickness 43$h$ of corresponding shaft 43 of respective sleeve 41, 42. In this way, a total width 1$h$ of drive system 1 may be greater than in the fifth exemplary embodiment, where thickness 41$h$ of flange 44 is approximately similar to wall thickness 43$h$ of shaft 43, for instance. The tenth exemplary embodiment of FIG. 16 thus illustrates that modifications of sleeves 41, 42 allow drive system 1 to be adapted to different vehicles 100 in a particularly simple and cost-effective manner.

Figure 17:
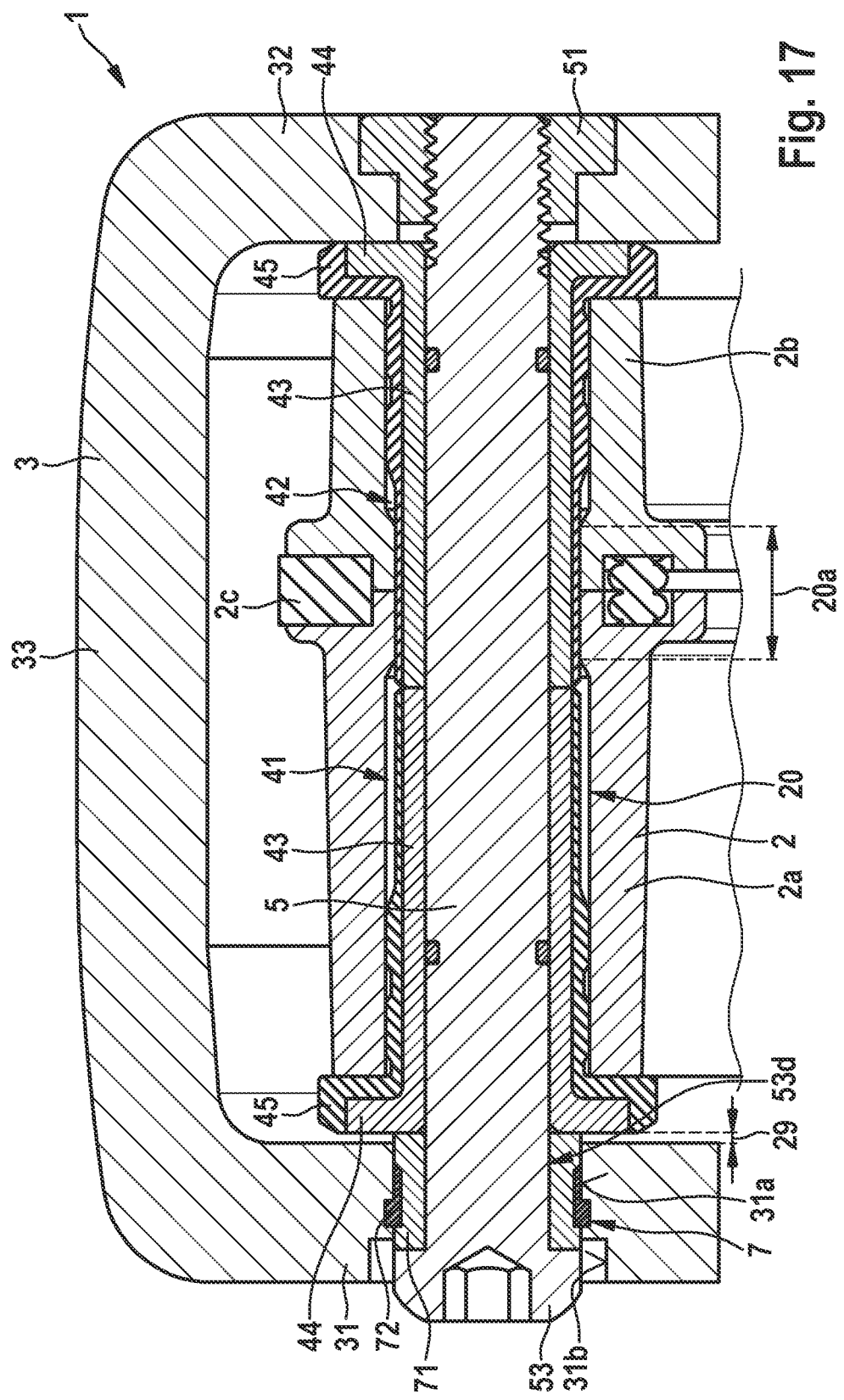
FIG. 17 shows a sectional view of a drive system according to a tenth exemplary embodiment of the present invention.

FIG. 17 shows a sectional view of a drive system 1 according to an eleventh exemplary embodiment of the present invention. The eleventh exemplary embodiment essentially corresponds to the first exemplary embodiment of FIGS. 1 through 4, with the difference of an alternative development of the floating bearing on first wall 31. In the eleventh exemplary embodiment of FIG. 17, through bolt 5 and tolerance compensation element 7 are jointly supported in an axially moveable manner relative to first wall 31. In contrast to the first exemplary embodiment, it is not bolt head 53 but a bolt shaft 53$d$ of through bolt 5 that is situated inside tolerance compensation element 7. In the eleventh exemplary embodiment, through bolt 5 additionally tensions tolerance compensation element 7 with respect to first sleeve 41. As a result, through bolt 5 and tolerance compensation element 7 can jointly slide in wall opening 31$a$ of first wall 31. Wall opening 31$a$ furthermore has an enlarged diameter 31$b$ on the outer side so that bolt head 53 is partially able to be positioned inside wall opening 31$a$. As an alternative, bolt head 53 may preferably also be situated completely outside wall opening 31$a$.

What is claimed is:

1. A drive system of a vehicle operable using muscular energy and/or motor power, comprising:
   a drive unit;
   a frame interface, the drive unit being situated at least partially between a first wall and a second wall of the frame interface;
   a holding device which holds the drive unit on each of the two walls, the holding device being fixed in place on the second wall; and
   a tolerance compensation element, the first wall having a first wall opening, the tolerance compensation element being a sleeve and being situated inside the first wall opening, and a part of the holding device is situated, using the tolerance compensation element inside the wall opening, in an axially movable manner,
   wherein the tolerance compensation element inside the wall opening is radially widened by the part of the holding device situated inside the wall opening so as to tension the tolerance compensation element with respect to the first wall.

2. The drive system as recited in claim 1, wherein the tolerance compensation element includes a plain bearing bush and a damping sleeve, which surrounds the plain bearing bush.

3. The drive system as recited in claim 2, wherein the plain bearing bush and the holding device are configured in such a way that the part of the holding device situated inside the tolerance compensation element widens the plain bearing bush in a radial direction, for a radial tensioning of the tolerance compensation element with respect to the first wall.

4. The drive system as recited in claim 3, wherein the plain bearing bush has a slot.

5. The drive system as recited in claim 4, wherein the slot of the plain bearing bush is configured with an angle with respect to an axial direction of the plain bearing bush.

6. The drive system as recited in claim 3, wherein the part of the holding device situated inside the tolerance compensation element is tapered in a direction of the second wall.

7. The drive system as recited in claim 3, wherein the damping sleeve has at least one sealing lip on a radial outer side, and the at least one sealing lip is configured in such a way that an axial form fit exists between the damping sleeve and the first wall when the tolerance compensation element is situated inside the first wall opening.

8. The drive system as recited in one of claim 7, wherein the damping sleeve is configured in such a way that the at least one sealing lip is forced radially outward when the part of the holding device is situated inside the tolerance compensation element.

9. The drive system as recited in claim 3, wherein the damping sleeve has at least one sealing lip on a radial inner side.

10. The drive system as recited in claim 2, wherein the damping sleeve of the tolerance compensation element is made from a vibration-damping material including an elastomer.

11. The drive system as recited in claim 2, wherein the plain bearing bush has on an outer circumference a plurality of grooves situated in parallel with a longitudinal direction.

12. The drive system as recited in claim 1, wherein:
   the drive unit has a through bore, and
   the holding device has a through bolt, which is pushed through the through bore.

13. The drive system as recited in claim 12, wherein the through bolt is a screw, and the through bolt is screwed into an internal thread of the second wall.

14. The drive system as recited in claim 13, wherein the through bolt is screwed into a nut which is situated on the second wall.

15. The drive system as recited in claim 14, wherein the nut is situated in a recess of the second wall in a torsionally fixed manner.

16. The drive system as recited in claim 1, wherein:
   the holding device has two screws, which are situated on a common screw axis, and
   the drive unit is fixed in place on one of the first and second walls using a screw.

17. A drive system of a vehicle operable using muscular energy and/or motor power, comprising:

a drive unit;

a frame interface, the drive unit being situated at least partially between a first wall and a second wall of the frame interface;

a holding device which holds the drive unit on each of the two walls, the holding device being fixed in place on the second wall;

a tolerance compensation element, the first wall having a first wall opening, the tolerance compensation element being a sleeve and being situated inside the first wall opening, and a part of the holding device is situated, using the tolerance compensation element inside the wall opening, in an axially movable manner; and two sleeves which are inserted into an opening of the drive unit on both sides, each of the sleeves has a shaft and a flange, the shaft is at least partially positioned inside the opening, and the flange is situated outside the opening.

18. The drive system as recited in claim 17, wherein each of the sleeves has a damping element, which is situated on a side of the flange facing the drive unit, and the damping element is made from an oscillation-damping material.

19. The drive system as recited in claim 18, wherein the damping element surrounds the shaft at least partially.

20. The drive system as recited in claim 18, wherein the openings of the drive unit are developed as a shared through bore, and the two sleeves are configured in such a way that, when they are fully inserted into the through bore and in a non-tensioned state, a predefined axial clearance exists between the two sleeves inside the through bore.

21. The drive system as recited in claim 20, wherein the predefined axial clearance is configured in such a way that, in a completely tensioned state, the axial clearance is compensated for by a tensioning of the two sleeves with the aid of the through bolt and by an elastic deformation of the damping element.

22. The drive system as recited in claim 17, wherein the flange of at least one of the sleeves inserted into the drive unit has a thickness that (i) essentially corresponds to a wall thickness of the shaft of the sleeve, or (ii) corresponds to at least 1.5 times a wall thickness of the shaft of the sleeve.

23. A vehicle operable using muscular energy and/or motor power, the vehicle comprising:

a drive system including:

a drive unit, a frame interface, the drive unit being situated at least partially between a first wall and a second wall of the frame interface, a holding device which holds the drive unit on each of the two walls, the holding device being fixed in place on the second wall, and a tolerance compensation element, the first wall having a first wall opening, the tolerance compensation element being a sleeve and being situated inside the first wall opening, and a part of the holding device is situated, using the tolerance compensation element inside the wall opening, in an axially movable manner, wherein the tolerance compensation element inside the wall opening is radially widened by the part of the holding device situated inside the wall opening so as to tension the tolerance compensation element with respect to the first wall, wherein the drive unit has at least one opening, and two sleeves are inserted into the opening on both sides, each of the sleeves having a shaft and a flange, the shaft being at least partially positioned inside the opening, and the flange being situated outside the opening.

24. The vehicle as recited in claim 23, further comprising:

a chainring which is connected to an output shaft of the drive unit, wherein the second wall of the drive system is situated on a side of the chainring.

25. The drive system as recited in claim 17, wherein the flange of the sleeve inserted into the opening of the drive unit has a multitude of projecting form-fit elements on the side of the flange that faces the wall, the form-fit elements being arranged in one or more circles concentrically with respect to the through opening of the sleeve.

* * * * *